Patented Apr. 7, 1931

1,799,217

UNITED STATES PATENT OFFICE

JUDSON A. DE CEW, OF NEW YORK, N. Y., ASSIGNOR TO PROCESS ENGINEERS, INC., OF NEW YORK, N. Y., A CORPORATION OF NEW YORK

PROCESS OF INCORPORATING EMULSIFIED RUBBER INTO PAPER PULP TO PRODUCE PAPER PRODUCTS

No Drawing. Application filed January 23, 1929. Serial No. 334,367.

Rubber particles, either in the form of aqueous dispersions of raw or recovered rubber or in the form of natural liquid latex, are used in the manufacture of strong pliable paper from cellulose fibres. In making paper from cellulose fibres by the ordinary processes of manufacture, the ingredients are mixed together in a beating engine with a rapidly revolving roll, the circulation being caused by the projecting knives of this roll. This is a satisfactory mixing machine for most of the materials used, but when rubber emulsions are used the beater roll not only acts as a mixer but also as a churn, which breaks up the rubber emulsion and causes the particles of rubber to adhere to each other and form lumps of rubber. This can occur even after the rubber is properly dispersed and fixed on the pulp fibres so that it is very difficult to incorporate rubber into a paper product without spoiling the dispersion at the time it is being fixed upon the fibres. As the action of the beater roll is destructive to rubber emulsions, the action of the Jordan is still more so; consequently the Jordan is rarely used by any mill that can successfully incorporate rubber into a paper product.

This difficulty in connection with rubber emulsions can be partly overcome by stabilizing the emulsions with the use of considerable alkali, or by the use of protective colloids. Even these agents, however, will not sufficiently protect the coagulated rubber from the destructive action of the Jordan. As the Jordan is one of the most effective machines, when properly used, for producing a well hydrated cellulose fibre, it is desirable that a method be found which will make it possible to use this apparatus to the fullest extent. If the Jordan is not used and the coagulation of the rubber takes place in the beater and enough of protective colloids are used to stabilize the emulsions sufficiently for this purpose, then the stabilizer will surround the rubber particles so that they will not adhere to each other with the greatest tenacity.

In my Patent No. 1,621,399, dated March 15, 1927, I have disclosed a method of coagulating a sensitive rubber emulsion by the use of aluminum hydrate, but I find that an excess of alumina is a detriment to the quality of the finished products.

I have therefore devised a method of incorporating the rubber emulsions, which not only enables me to use a rubber emulsion containing much less of the stabilizing agents but which also enables me to obtain the full use of the Jordan engine. In my process I treat the cellulose paper stock to the required extent in the beating engine and then give it a full treatment in the Jordan engine in order to obtain the maximum amount of hydration. This latter step is desirable, although not essential, as in some cases there may not be a Jordan in the mill. After the stock is ready to receive the rubber emulsions, it is passed from either the beater or the Jordan into another mixing device where the rubber emulsions and the coagulants can be rapidly mixed with the pulp stock without any damage to the rubber coagulate. This may be done by the batch method in which the stock is mixed with a slow moving agitator, but I prefer to mix the materials continuously in such a manner that a stream of dilute rubber emulsion is mixed with a stream of pulp fibres and agitated with it in a continuous mixer. After this, the stream of cellulose pulp stock containing the dispersed rubber, receives a stream of coagulating solution, such as sulphate of alumina, and further mixing takes place. This coagulant may be added in stages as the mixing progresses, until the rubber is no longer in emulsion but is fixed upon the pulp fibres. After this, the fibres may be sized by the use of my process as disclosed in United States Patent No. 1,558,845 dated October 27, 1925.

The chief advantage of these methods is that sensitive emulsions of rubber can be used and it will make a stronger and tougher paper and one with more uniform stretch than will rubber emulsions that are coagulated in the beating engine. It is also possible to get a greater production from the paper mill equipment.

Another method of incorporating the rubber ingredients is to make them very dilute and mix them with the paper stock after it has passed through the paper machine screen when the paper stock is also greatly diluted with water. Under these conditions the mixing action is very rapid and the coagulating action can take place quickly without bad effects as the great degree of dispersion of all the materials makes it possible to deposit the rubber in a finer state of subdivision over the surface of the fibres and this gives the paper product a more uniform character. Moreover, by this method the agitation at the paper machine screen can be avoided.

I have now disclosed several methods by which the rubber may be incorporated with the pulp, all of them being carried out after all beating action is finished and the stock is removed from the beating machines. The mixing may be carried out by treating separate batches of the stock and mix the rubber and the coagulant in separate operations. On the other hand, the emulsions may be added continuously into a continuous flow of pulp stock and the coagulant added continuously, the treatment taking place before the stock is diluted for the paper making screen, or the dilute emulsion and the dilute coagulant may be added continuously to the water that contains a small percentage of pulp fibres, after the screening operation is completed. It is also possible to add the dilute rubber emulsions to the diluted stock after the screen, even if the coagulating material has been added at some earlier stage in the operations, for with the diluted condition the rubber emulsion is less likely to form a lump coagulate, although it would be fatal to the material if it were added after the coagulating agent in the beater.

It is desirable to have the coagulating material in a dilute solution and also to add it to the pulp containing the rubber, in various stages or at different mixing points, so that the rate of coagulation may be controlled. This is important where the pulp is not in a diluted condition.

In making paper containing emulsified rubber, it is understood that rubber does not act as a sizing material and in this respect is not a substitute for resinous sizing agents. When a water proof paper product is desired, therefore, special sizing agents must be used. These may be added to the paper stock in the beating engine, and may be either coagulated therein or later. The kind of sizing material used and the method by which it is incorporated may have a pronounced effect upon the character and properties of the rubberized paper and the procedure adopted will depend upon various conditions of water and stock. I may therefore add the sizing to the beater and add the rubber after the stock has left the beater and then add the coagulant which will fix the rubber and the size on the fibres simultaneously. Again I may add the sizing material to the beater and coagulate it therein, and add the rubber emulsion and more coagulant by special mixing in the last operation just before the stock goes to the paper machine. On the other hand there may be special conditions in which it is preferable to add neither sizing or rubber to the beater but to add the sizing emulsion after the rubber emulsions but withholding the addition of these materials until the last mixing operations.

It is to be understood that the present disclosure is for the purpose of illustration only, and that the invention is not limited thereto. To those skilled in the art, many modifications of the invention will be readily apparent, and it will also be obvious to such skilled persons that parts of the device may be used without other parts thereof, and steps in the method, without other steps, many such combinations readily suggesting themselves. Therefore, it should be and is to be distinctly understood that for a definition of the limitations of the invention, reference must be had to the appended claims.

Having now described the invention, what is claimed as new, and for which Letters Patent of the United States is desired, is:

1. A method of incorporating emulsified rubber particles into cellulose paper pulp, which consists in mixing the rubber emulsion with the paper stock after said stock has been discharged from the beater, and adding and mixing a coagulant to fix the rubber on the cellulose fibres, then making it into a sheet of paper.

2. A method of incorporating emulsified rubber particles into cellulose paper pulp, which consists in mixing the rubber emulsion with the paper stock after said stock has been discharged from the Jordan, and adding and mixing a coagulant to fix the rubber on the cellulose fibres, then making it into a sheet of paper.

3. A step in the manufacture of a pliable cellulose paper product containing rubber, which consists in mixing the rubber emulsion with the paper pulp and coagulating them in a special mixing device after the pulp has been discharged from the hydrating machinery.

4. A method of depositing rubber emulsions uniformly over the surface of cellulose paper pulp fibres, which consists in adding the emulsions while the fibres are being stirred in a moderate manner in an apparatus located between the beating engine and the paper machine.

5. A method of depositing rubber emulsions uniformly over the surface of cellulose paper pulp fibres, which consists in coagulating the emulsions while the fibres are being stirred in a moderate manner in an apparatus located between the Jordan and paper machine.

6. A step in the manufacture of a cellulose paper product containing emulsified rubber, which consists in adding a coagulant to a mass of cellulose pulp fibres containing rubber emulsions while it is being stirred in a moderate manner after the beating machines and before the paper machine.

7. A method of coagulating rubber emulsions in cellulose paper pulp, which comprises adding a coagulant to the mass of cellulose fibres and rubber emulsion in successive stages of treatment, after the fibres have been removed from the hydrating machines.

8. A method of incorporating emulsified rubber into cellulose paper pulp, which consists in beating or Jordaning the pulp, passing the stock to another mixer, then mixing the emulsified rubber with the pulp, then adding a coagulant for the rubber, then adding the sizing ingredients, and finally making it into a sheet of paper.

9. A method of incorporating rubber emulsions into cellulose paper stock, which consists in adding a rubber emulsion and a coagulant to a diluted paper stock after the stock has passed the paper machine screen.

10. A method of incorporating rubber emulsions which consists in adding the rubber emulsions in a continuous stream to a dilute material containing cellulose paper making fibres, after the fibres have passed the paper machine screen.

11. The method of paper making which comprises treating the cellulose fibres in a dilute condition after they have passed the paper machine screen, with a dilute emulsion of rubber and a dilute solution of a coagulating salt, and then forming the pulp and rubber mass into a sheet of paper.

12. A method of adding rubber emulsions to cellulose paper pulp fibres, which consists in treating the fibres in the beating engine with a coagulant from the rubber emulsions, and then adding the rubber emulsions to the solution containing the cellulose fibres, after the fibres have passed through the paper machine screen.

13. A method of incorporating rubber into emulsified form with cellulose pulp fibres, which consists in adding the sizing material and the rubber coagulant to the beating engine and adding the rubber in a dilute emulsion to the diluted stock just before it goes to the paper machine.

14. A method of making a cellulose paper product containing rubber and alkaline materials, which consists in adding continuously a dilute rubber emulsion and a dilute sizing material to the pulp fibres just before they reach the paper machine, and then adding a solution of a coagulant to fix the rubber and the size upon the cellulose fibres.

Signed at New York, in the county of New York, and State of New York, this 18 day of January, 1929.

JUDSON A. DE CEW.